US012762952B2

(12) United States Patent
Monninger

(10) Patent No.: US 12,762,952 B2
(45) Date of Patent: Oct. 13, 2026

(54) METHOD FOR DETERMINING AND PROVIDING LANE ROUTES

(71) Applicant: MERCEDES-BENZ GROUP AG, Stuttgart (DE)

(72) Inventor: Thomas Monninger, Sunnyvale, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 17 days.

(21) Appl. No.: 18/877,300

(22) PCT Filed: May 23, 2023

(86) PCT No.: PCT/EP2023/063838
§ 371 (c)(1),
(2) Date: Dec. 20, 2024

(87) PCT Pub. No.: WO2024/002589
PCT Pub. Date: Jan. 4, 2024

(65) Prior Publication Data

US 2025/0384767 A1 Dec. 18, 2025

(30) Foreign Application Priority Data

Jun. 28, 2022 (DE) .................... 10 2022 002 334.2

(51) Int. Cl.
*G08G 1/0968* (2006.01)
*G01C 21/00* (2006.01)
(Continued)

(52) U.S. Cl.
CPC ... *G08G 1/096811* (2013.01); *G01C 21/3407* (2013.01); *G01C 21/3867* (2020.08); *G08G 1/20* (2013.01)

(58) Field of Classification Search
CPC ............... G08G 1/096811; G08G 1/20; G01C 21/3867; G01C 21/3407
(Continued)

(56) References Cited

U.S. PATENT DOCUMENTS 5,006,988 A * 4/1991 Borenstein ........... G05D 1/0255 701/25
9,360,332 B2 6/2016 Strauss et al.
(Continued)

FOREIGN PATENT DOCUMENTS

DE 102013208521 A1 11/2014
DE 102013211696 A1 12/2014
(Continued)

OTHER PUBLICATIONS

International Search Report and Written Opinion mailed Sep. 15, 2023 in related/corresponding International Application No. PCTEP2023063838.
(Continued)

*Primary Examiner* — Luis A Martinez Borrero
(74) *Attorney, Agent, or Firm* — PATENT PORTFOLIO BUILDERS PLLC

(57) ABSTRACT

A central computing unit determines and provides lane routes of streets to vehicles of a vehicle fleet. A geometric map having geometric lane boundaries and applying a grid with grid cells of a specified size to the map is provided. Fleet data is collected from fleet, the fleet data including position sequences covered by the fleet vehicles. Vehicle orientations of the vehicles at positions of the grid cells are determined from the collected position sequences. The determined vehicle orientations are discretized and a histogram is generated for each individual grid cell position for the discretized vehicle orientations. A map section having a specified amount of grid cells is selected and the lane routes
(Continued)

Figure 1:
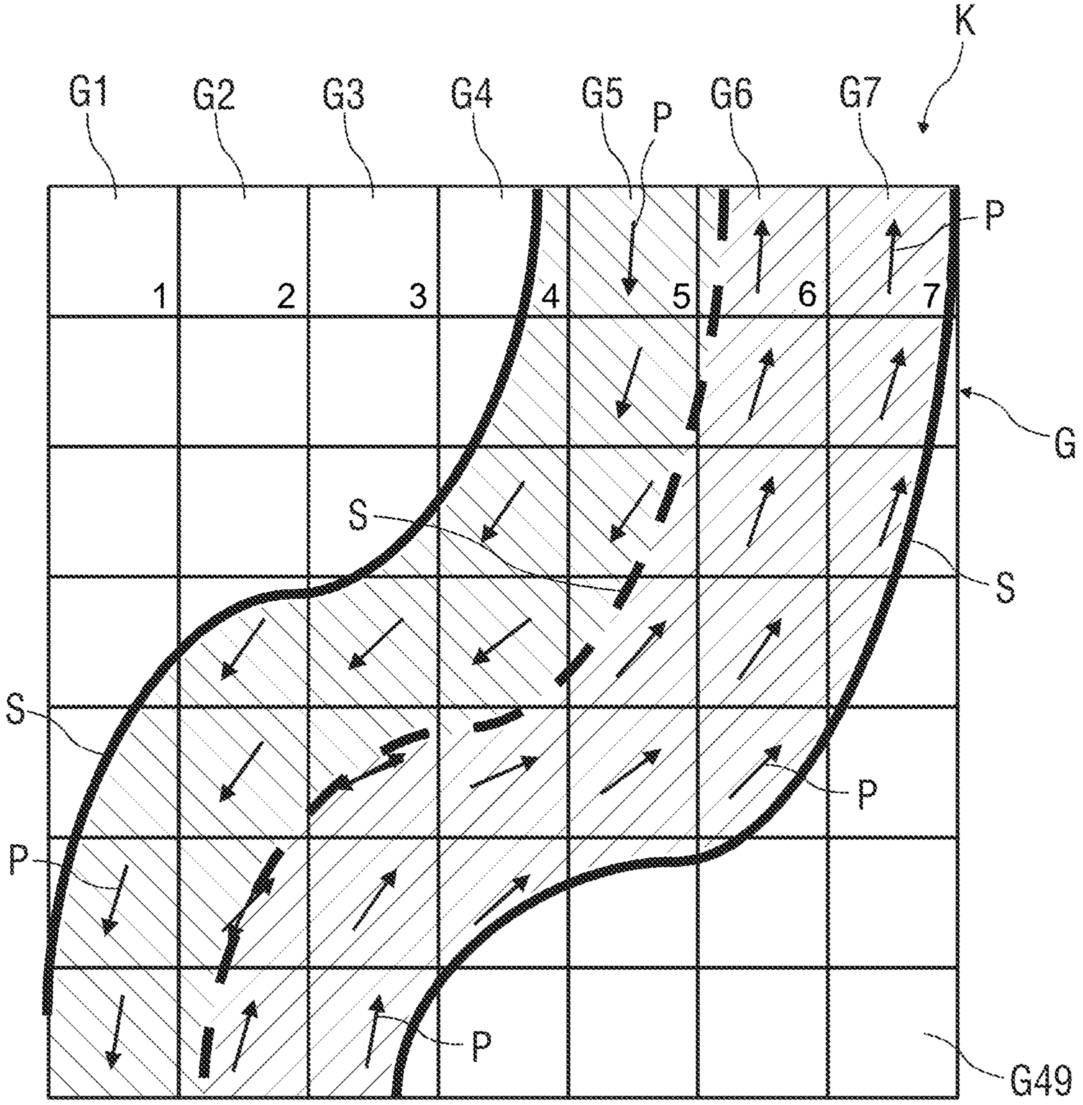

on the map section are determined using a learning-based method from the histograms created for the grid cells of the map section and the geometric lane boundaries on the map section.

6 Claims, 3 Drawing Sheets

(51) Int. Cl.
*G01C 21/34* (2006.01)
*G08G 1/00* (2006.01)

(58) Field of Classification Search
USPC .......................................................... 701/422
See application file for complete search history.

(56) References Cited

U.S. PATENT DOCUMENTS

| | | | | |
|---|---|---|---|---|
| 12,091,004 | B2* | 9/2024 | Kumano | B60W 30/12 |
| 2008/0089579 | A1* | 4/2008 | Han | G06F 18/214 382/159 |
| 2013/0110385 | A1* | 5/2013 | Heed | G08G 1/202 701/410 |
| 2018/0188043 | A1* | 7/2018 | Chen | G06T 17/05 |
| 2018/0188742 | A1* | 7/2018 | Wheeler | G01C 21/30 |
| 2018/0190016 | A1* | 7/2018 | Yang | G06T 17/05 |
| 2018/0202814 | A1* | 7/2018 | Kudrynski | G01C 21/30 |
| 2019/0113927 | A1* | 4/2019 | Englard | B60W 60/0015 |
| 2019/0226853 | A1* | 7/2019 | Kubiak | G01C 21/3811 |
| 2019/0266418 | A1* | 8/2019 | Xu | G06V 10/44 |
| 2020/0081134 | A1* | 3/2020 | Wheeler | G01C 21/165 |
| 2020/0378776 | A1* | 12/2020 | Omari | G01C 21/3453 |
| 2020/0393265 | A1* | 12/2020 | Piao | G01C 21/3815 |
| 2021/0331671 | A1* | 10/2021 | Kumano | B60W 30/12 |
| 2021/0397192 | A1* | 12/2021 | Alberts | G01C 21/3617 |
| 2022/0089183 | A1 | 3/2022 | Hwu et al. | |
| 2022/0274624 | A1* | 9/2022 | Wray | G01C 21/3837 |
| 2022/0276653 | A1* | 9/2022 | Wray | G01C 21/3415 |

FOREIGN PATENT DOCUMENTS

| | | | |
|---|---|---|---|
| DE | 102013018315 | A1 | 4/2015 |
| DE | 102019119002 | A1 | 1/2021 |
| EP | 2679956 | A2 | 1/2014 |
| EP | 2888604 | B1 | 7/2019 |

OTHER PUBLICATIONS

Office Action created Feb. 8, 2023 in related/corresponding DE Application No. 10 2022 002 334.2.

* cited by examiner

H

| | G1 | G2 | G3 | G4 | G5 | G6 | G7 |
|---|---|---|---|---|---|---|---|
| 0°-60° | 0 | 0 | 0 | 0 | 0 | 47 | 65 |
| 60°-120° | 0 | 0 | 0 | 0 | 4 | 3 | 6 |
| 120°-180° | 0 | 0 | 0 | 0 | 28 | 0 | 0 |
| 180°-240° | 0 | 0 | 0 | 0 | 35 | 0 | 0 |
| 240°-300° | 0 | 0 | 0 | 0 | 2 | 0 | 0 |
| 300°-360° | 0 | 0 | 0 | 0 | 0 | 9 | 2 |

FIG 2

METHOD FOR DETERMINING AND PROVIDING LANE ROUTES

BACKGROUND AND SUMMARY OF THE INVENTION

Exemplary embodiments of the invention relate to a method for determining and providing lane routes of streets by means of a central computing unit coupled in a data-processing manner to vehicles of a vehicle fleet.

DE 10 2013 211 696 A1 discloses a method for completing and/or updating a digital street map of a geographical region, an apparatus for a motor vehicle and a motor vehicle. The method has the steps: a) detecting a digital image of a road section by means of a camera of a motor vehicle located on the road section; b) determining a current position of the motor vehicle in a lateral direction of the road section and/or at least one characteristic of the road section using the image by means of a computing device of the motor vehicle; c) transmitting a data set to a server device, which contains information about a geographical position of the detection of the image and information about the at least one determined characteristic of the road section and/or the position in the lateral direction. Therefore, steps a) to c) are carried out by a plurality of motor vehicle located in the region and the digital street map is completed and/or actualized using the received data set by means of the server device.

DE 10 2013 018 315 A1 discloses a method for providing an environment model for a vehicle, in which a grid map is used to represent the environment model this grid map is adapted to a lane route, for example the cells of the grid map are also arranged in a curve when the lane curves.

DE 10 2013 208 521 A1 discloses a method for creating a street model in which trajectory data is determined from fleet data and a street model is created from this trajectory data using statistical methods.

DE 10 2019 119 002 A1 discloses a method for determining a lane in which lane markings are scanned, orientations of the scans are determined, and the scans are clustered taking into consideration the orientations.

EP 2 888 604 B2 discloses a method for determining a lane route for a vehicle in which the position of the vehicle is determined in a grid map and the orientation and distance of said vehicle with respect to grid cells with a lane boundary are determined.

Exemplary embodiments of the invention are directed to a novel method for determining lane routes of streets.

A method for determining and providing lane routes of streets by means of a central computing unit coupled in a data-processing manner to vehicles of a vehicle fleet provides, according to the invention, that a geometric map having geometric track boundaries is provided and a grid with grid cells of a specified size is applied to the map. Fleet data is collected from vehicles of the vehicle fleet, wherein the fleet data comprises position sequences covered by the vehicles of the vehicle fleet. Furthermore, vehicle orientations of the vehicles at positions of the grid cells are determined from the collected position sequences and the determined vehicle orientations are discretized. Subsequently, a histogram for each individual grid cell position for the discretized vehicle orientations determined at the position of the respective grid cell is generated, a map section having a specified amount of grid cells is selected and lane routes are determined on the map section by means of a learning-based method from the histograms created for the grid cells of the map section and the geometric lane boundaries on the map section.

Combined processing of geometric infrastructure and fleet driving behavior is enabled by using the method. Therefore, a fully automated derivation of lane routes can be implemented, whereas derivation based purely on geometric infrastructure always requires manual reworking and a derivation of the lane routes based on the fleet driving behavior does not achieve full coverage.

By using geometric information, it can be largely ensured that modelled lane routes are adapted to a given infrastructure.

Since the method provides the use of the fleet driving behavior, a human driving style, i.e., a manual driving operation of vehicles of the vehicle fleet, is taken into account. Therefore, lane modelling in unstructured areas, for example at points with missing lane markings and/or bus lanes, is supported.

The learning-based method substantially automatically takes into account special cases if these are shown in the data set, i.e., in the fleet data. The method can be scaled by means of fleet data, whereby the determination of the lane routes continually improves with increasing training examples.

Furthermore, the learning-based method can directly generate geometries of lane routes. Furthermore, an older route of lanes can optionally be taken into account in the learning-based method, so that only one parameter of a lane segment has to be predicted in relation to anchor point, orientation, curvature, and/or lane width. Therefore, a training process is facilitated, and it can largely be ensured that geometrically valid lane segments are constantly generated.

An abstraction of the lane routes, determined using the fleet data of the vehicles, into the grid enables consistent processing of the driving behavior of a vehicle assigned to the vehicle fleet with varying numbers of journeys.

A multi-dimensional grid allows modelling of multiple directions of travel, for example on bidirectional streets or in junction areas.

A grid created depending on different time points enables detection of changes in the fleet driving behavior and thus a conclusion to be drawn about changes to street infrastructure. Thus, changes can also be determined that are not detected using signals recorded by a vehicle sensor, for example a road sign which prevents a turn.

Since processing takes place at grid cell level, it is possible to break down the problems into sub-problems in relation to the determination of the lane routes, thus enabling parallelization.

In one embodiment, the determined lane routes are provided to the vehicles of the fleet for retrieval. An optimized automated and autonomous driving operation of the corresponding vehicle is possible using these provided determined lane routes. The respective lane route is known, so that it is not necessary in the automated or autonomous driving operation, for example due to a missing lane marking, for a driver of the vehicle to take over a driving task and for the vehicle to move in the manual driving operation.

In a further embodiment, the determined lane routes are provided to the vehicles as data in a digital map and stored in this, so that an automated or autonomous driving operation of the vehicle can be substantially improved without intervention from a driver.

A possible embodiment of the method provides that the determined lane routes are supplied to a trajectory planning module of autonomously driving vehicles of the vehicle fleet. A trajectory for the respectively autonomously driving vehicle is then planned based on the determined lane routes, so that an optimized autonomous driving operation of the vehicle can be implemented by handing over a driving task to a driver of the vehicle substantially without interruptions.

In a development of the method, training the learning-based method takes place by means of created histograms and by means of ground truth maps which are created for specified regions. Thus, the learning-based method is trained using real data and is optimized for determining the lane routes using the transmitted fleet data.

BRIEF DESCRIPTION OF THE DRAWING FIGURES

Exemplary embodiments of the invention are explained in more detail in the following using the drawings.

Figure 3:
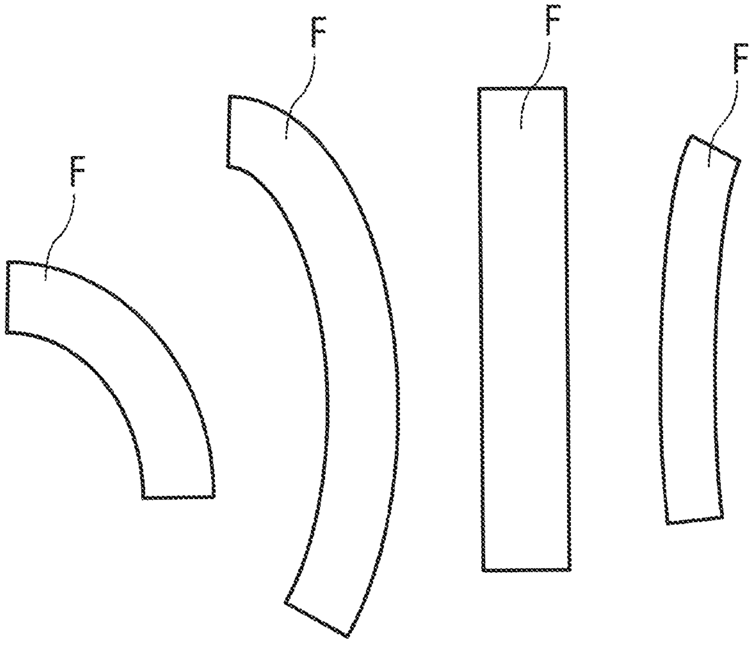

Here:

FIG. 1 schematically shows a section of a geometric map with geometric track boundaries and an applied grid with grid cells, FIG. 2 schematically shows a histogram generated for each grid cell position with frequency distributions and FIG. 3 schematically shows a plurality of tubular corridors.

Parts corresponding to each other are provided with the same reference numerals in all the figures.

DETAILED DESCRIPTION

In FIG. 1, a section of a geometric map K with geometric lane boundaries S and an applied grid G with grid cells G1 to G49 is represented.

FIG. 2 shows the grid G having the grid cells G1 to G49 filled out by means of a data structure and in FIG. 3 a plurality of determined tubular corridors F is represented.

In general, it is known that an automated and autonomous driving operation of a vehicle requires a highly accurate digital map, i.e., street map, wherein content of the digital map has to be correct and updated. Such digital maps having lane-accurate modelling of topology are mandatory for use cases of the automated driving operation at a level 2+ or higher of a standard SAE J3016. Cartography is carried out in perspective using signals detected by a vehicle sensor system of vehicles of a vehicle fleet, in particular of a vehicle manufacturer. Comparatively large-scale coverage is achieved by means of the vehicles of the vehicle fleet and the vehicles send fleet data as information in relation to a static infrastructure, such as for example recognized road signs and lane markings, to a central computing unit coupled in a data-processing manner to the vehicles of the vehicle fleet.

Along with this recognized information in relation to the static infrastructure as environment information, a pose, in particular orientation, located using satellite navigation of the respective vehicle is also transmitted to the central computing unit, in order to transfer detection relative to a vehicle coordinate system into a global coordinate system. Additionally, the satellite navigation supplies information about driving behavior of individual vehicles, in particular about drivable corridors F.

In the following, a method for determining and providing lane routes of streets by means of the central computing unit coupled in a data-processing manner to the vehicles of the vehicle fleet is described. In the case, the method is multi-stage.

Initially, the geometric map K is provided with the lane boundaries S and the grid G is applied with the grid cells G1 to G49. In this case, the grid cells G1 to G49 have a specified size in relation to the map K. In particular, the geometric map K is provided from observations of the vehicles of the vehicle fleet with approaches known from the prior art. Individual steps for this are a so-called single-trace pose optimization, multi-trace alignment, geometric aggregation.

Fleet data of the vehicles of the vehicle fleet is collected in the central computing unit. In this case, the fleet data comprises position sequences driven by the vehicles of the vehicle fleet. The respective orientation of the vehicles is detected as fleet data, wherein the position sequences have a specified time or length. The time or length chosen is comparatively short in order to anonymize the collected fleet data and to make it difficult to draw conclusions about a movement profile of the respective vehicle. Therefore, all orientations are localized and detected with respect to the geometric map K for lane-accurate positions of the vehicles. In particular, the orientations of the vehicles at positions of the grid cells G1 to G49 are determined from the collected position sequences.

The determined vehicle orientations are discretized, i.e., the determined vehicle orientations are categorized into a specified grid, for example a 60° grid. In other words: a data structure for the grid G is generated depending on a respective geographical position. The dependency of the grid G on the geographical position, i.e., in relation to the global coordinate system having the coordinates x, y, z, can be discretized by means of the specified grid of the geographical map K into squares of 1 m×1 m.

A histogram H is then generated for each individual grid cell position for the discretized vehicle orientations determined at the position of the respective grid cell G1 to G49. In this case, a frequency distribution is modelled multi-dimensionally depending on the direction of travel by means of the grid cells G1 to G49, in order to be able to map geographical points having multiple directions of travel, for example in junction areas. The frequency distribution can be discretized by means of classification into 10° classes, for example.

A learning-based method, for example convolutional neural network, transformer network, graph neural network, uses geometric lane boundaries S, in particular lane markings, curbs etc. from the previously provided geometric map K and the grid G with the frequency distributions from the fleet data as input information, and supplies a lane model as output information.

The learning-based method is trained by means of ground truth maps, which map the actual lane routes for determined regions. The learning-based method uses examples to learn how the lane model can be generated from geometric lane boundaries S (lane markings, curbs etc.) and a histogram H.

FIG. 1 shows by way of example a section of a grid G having an overlay of the lane boundaries S. Modes of distribution across the direction of travel are represented by means of arrows P.

It can be seen comparatively well that in grid cells G1 to G49, through which vehicles drive in both directions of travel, two arrows P are represented pointing in opposite directions.

Grid cells G1 to G49 of a first row R1 are numbered, wherein a first cross-hatched corridor F and another second cross-hatched corridor F are the lane routes generated using the learning-based method.

In FIG. 2, a respective histogram H for the grid cells G1 to G7 of the grid G is shown by way of example. A discretization of the vehicle direction with 60° classes was selected. In particular, FIG. 2 shows a respective histogram H with the number of discretized vehicle orientations determined for the respective grid cells G1 to G49 shown in FIG. 1.

According to a grid cell G5 shown in FIG. 1, it can be seen that a vehicle has driven in this cell with an orientation that is represented by a downward pointing arrow P. Therefore, a mode (a maximum of a distribution) in the histogram H is at about 200°.

The grid cells G6 and G7 are driven through with an orientation of the vehicles in the opposite direction of travel, and the mode in the histogram H is at about 20°.

The respective histogram H based on the grid cells G1 to G7 of the grid G is a comparatively efficient representation of any number of traversals of the grid cells G1 to G49 of the grid G applied onto the geographical map K and reflects fleet driving behaviors of the vehicles in a standardized form.

Using such a process of abstraction, the histogram H serves as a consistent input for the downstream learning-based method which derives the lane routes by including geometric surroundings.

Such a standard representation of a variable number of traversals can also be used to detect changes in the fleet driving behavior comparatively early on in a mapping development. Changes can also be detected in the fleet driving behavior which are not detected using signals recorded by the vehicle sensor system, such as a special road sign, for example, which prevents a turn.

The lane routes to be generated by means of the learning-based method are tubular corridors F, from a geometric point of view. For this reason, a present older lane route can optionally be taken into account by means of the learning-based method, so that the learning-based method only has to predict parameters of a lane segment, for example anchor point, orientation, curvature, lane width. This facilitates a training process and can ensure that geometrically valid lane routes are constantly generated. Examples for such tubular corridors F, which arise as a result of the suitable choice of input parameters for the learning-based method, are shown in FIG. 3.

Furthermore, the method provides that the determined lane routes in the form of tubular corridors F are provided to the vehicles of the vehicle fleet as data in the digital maps.

In particular, the determined lane routes are supplied to a trajectory planning module of an automated or autonomously driving vehicle so that a trajectory of the vehicle can be planned according to the present lane routes.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method comprising:

receiving, by a central computing unit, a geometric map having geometric lane boundaries;

applying, by the central computing unit, a grid with grid cells of a specified size to the geometric map;

collecting, by the central computing unit, fleet data from vehicles of a vehicle fleet, wherein the fleet data comprises position sequences covered by the vehicles of the vehicle fleet;

determining, by the central computing unit, vehicle orientations of the vehicles at positions of the grid cells from the collected position sequences;

discretizing, by the central computing unit, the determined vehicle orientations;

generating, by the central computing unit, a histogram for each individual grid cell position for the discretized vehicle orientations determined at the position of a respective grid cell;

selecting, by the central computing unit, a map section having a specified amount of grid cells;

determining, by the central computing unit, the lane routes on the map section by a learning-based method from the histograms created for the grid cells of the map section and the geometric lane boundaries on the map section;

supplying, by the central computing unit, the determined lane routes to a trajectory planning module of one of the vehicles of the vehicle fleet, wherein the one of the vehicles of the vehicle fleet is an autonomously driving vehicle; and autonomously operating the one of the vehicles along a trajectory defined by the trajectory planning module along one of the determined lane routes.

2. The method of claim 1, wherein the determined lane routes are provided to the vehicles of the vehicle fleet for retrieval.

3. The method of claim 1, wherein the determined lane routes are provided to the vehicles as data in a digital map.

4. The method of claim 1, wherein the determined lane routes are supplied to a trajectory planning module of a plurality of autonomously driving vehicles of the vehicle fleet.

5. The method of claim 1, wherein training the learning-based method takes place the generated histograms and by ground truth maps created for specified regions.

6. The method of claim 1, wherein the trajectory along which the one of the vehicles of the vehicle fleet is autonomously operated is missing lane markings or is a bus lane.

* * * * *